United States Patent
Du et al.

(10) Patent No.: US 9,785,464 B2
(45) Date of Patent: Oct. 10, 2017

(54) INTELLECTIVE SWITCHING BETWEEN TASKS

(71) Applicant: INTERNATIONAL BUSINESS MACHINES CORPORATION, Armonk, NY (US)

(72) Inventors: Jun Yi Du, Ningbo (CN); Yue Liu, Ningbo (CN); Chuan Yang Wang, Ningbo (CN); Xiao Wang, Ningbo (CN); Yu Zhao, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/753,632

(22) Filed: Jun. 29, 2015

(65) Prior Publication Data
US 2016/0378544 A1    Dec. 29, 2016

(51) Int. Cl.
    *G06F 9/46*      (2006.01)
    *G06F 9/48*      (2006.01)

(52) U.S. Cl.
    CPC ................ *G06F 9/4843* (2013.01)

(58) Field of Classification Search
    None
    See application file for complete search history.

(56) References Cited

U.S. PATENT DOCUMENTS

| | | |
|---|---|---|
| 7,565,340 B2 | 7/2009 | Herlocker et al. |
| 8,510,743 B2 | 8/2013 | Hackborn et al. |
| 2010/0274744 A1* | 10/2010 | Brdiczka .............. G06Q 10/06 706/12 |
| 2014/0019975 A1* | 1/2014 | Schmidt ............... G06F 9/4446 718/100 |
| 2014/0297407 A1 | 10/2014 | Sanghavi et al. |

OTHER PUBLICATIONS

Real-time detection of task switches of desktop users, Jan. 2007.*
Shen et al. "Real-Time Detection of Task Switches of Desktop Users, Jan. 2007" listed in IDS filed on Jun. 29, 2015.*
Jianqiang Shen et al., "Real-Time Detection of Task Switches of Desktop Users". Conference Paper Proceedings of the International Joint Conference on Artificial Intelligence (IJCAI-07), Jan. 2007.

* cited by examiner

*Primary Examiner* — Sisley Kim
(74) *Attorney, Agent, or Firm* — Isaac J. Gooshaw, Esq.; George S. Blasiak, Esq.; Heslin Rothenberg Farley & Mesiti, PC

(57) ABSTRACT

Methods, computer program products, and system are presented. The methods include, for instance: identifying, by one or more processor, a current task, obtaining, by the one or more processor, an indicator of a commencement of a switching event, where the switching event includes a transition originating from the current task and concluding at a new task, obtaining, by the one or more processor, behavior analysis data relating to a plurality of past switching events, where each past switching event includes a transition originating from the current task and concluding at a target task. The behavior analysis data includes a timestamp for each past switching event. The method also includes determining, by the one or more processor, based on the behavior analysis data, at least one recommended task, where the at least one recommended task includes at least one target task.

18 Claims, 9 Drawing Sheets

INTELLECTIVE SWITCHING BETWEEN TASKS

TECHNICAL FIELD

The present disclosure relates to repetitive tasks during a computing session, and more particularly, forecasting future tasks in the computing session.

BACKGROUND

The present disclosure relates to repetitive tasks during a computing session. By way of background, in current information-based society, users of computer systems often use a variety of applications, and/or access a variety of files within the same type of application, including on their personal computers and/or mobile devices, in order to complete different activities. The level of complexity of certain computing activities necessitates completing a group of individual tasks, and to complete each task, a user may need to switch among applications and/or among files that utilize a common application.

SUMMARY

Shortcomings of the prior art are overcome and additional advantages are provided through the provision, in one aspect, of a method. The method includes identifying, by one or more processor, a current task, obtaining by the one or more processor, an indicator of a commencement of a switching event, where the switching event includes a transition originating from the current task and concluding at a new task. The method includes obtaining, by the one or more processor, behavior analysis data relating to a plurality of past switching events, where each past switching event of the plurality of past switching events includes a transition originating from the current task and concluding at one of a plurality of target tasks and the behavior analysis data includes a timestamp for each past switching event. The method includes determining, by the one or more processor, based on the behavior analysis data, at least one recommended task, where the at least one recommended task includes at least one target task of the plurality of target tasks.

In another aspect, a computer program product is provided. The computer program product includes: a computer readable storage medium readable by one or more processor and storing instructions for execution by the one or more processor for performing a method that includes identifying, by the one or more processor, a current task, obtaining by the one or more processor, an indicator of a commencement of a switching event, where the switching event includes a transition originating from the current task and concluding at a new task. The method includes obtaining, by the one or more processor, behavior analysis data relating to a plurality of past switching events, where each past switching event of the plurality of past switching events includes a transition originating from the current task and concluding at one of a plurality of target tasks and the behavior analysis data includes a timestamp for each past switching event. The method includes determining, by the one or more processor, based on the behavior analysis data, at least one recommended task, where the at least one recommended task includes at least one target task of the plurality of target tasks.

In a further aspect, a system is provided. The computer system includes: a memory; and one or more processor in communication with the memory, where the network device is configured to perform a method, the method including: identifying, by the one or more processor, a current task, obtaining by the one or more processor, an indicator of a commencement of a switching event, where the switching event includes a transition originating from the current task and concluding at a new task. The method includes obtaining, by the one or more processor, behavior analysis data relating to a plurality of past switching events, where each past switching event of the plurality of past switching events includes a transition originating from the current task and concluding at one of a plurality of target tasks and the behavior analysis data includes a timestamp for each past switching event. The method includes determining, by the one or more processor, based on the behavior analysis data, at least one recommended task, where the at least one recommended task includes at least one target task of the plurality of target tasks.

Additional features and advantages are realized through the techniques set forth herein. Other embodiments and aspects are described in detail herein and are considered a part of the claimed disclosure.

BRIEF DESCRIPTION OF THE DRAWINGS

One or more aspects of the present disclosure are particularly pointed out and distinctly claimed as examples in the claims at the conclusion of the specification. The foregoing and other objects, features, and advantages of the present disclosure are apparent from the following detailed description taken in conjunction with the accompanying drawings in which:

DETAILED DESCRIPTION

Figure 1:
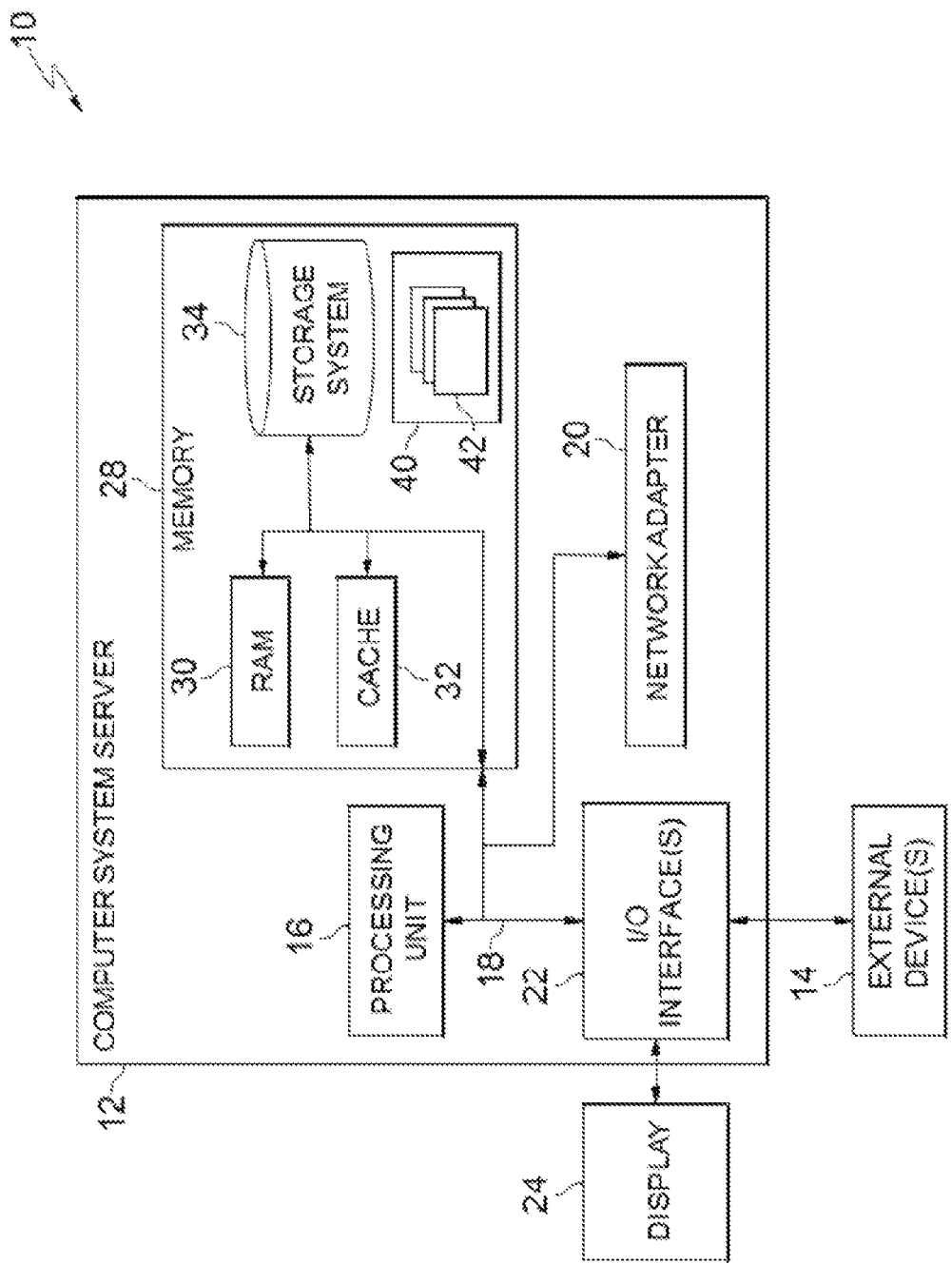
FIG. 1 depicts a cloud computing node, in accordance with one or more aspects set forth herein.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects described herein, are given by way of illustration only, and not by way of limitation. Various substitutions, modifications, additions, and/or arrangements, within the spirit and/or scope of the underlying concepts will be apparent to those skilled in the art from this disclosure.

Embodiments of the present invention recognize that switching between applications and tasks to complete activities on computer systems is inefficient. Moving from one application to another and/or from one instance of an application to another, may require searching for each application and/or instance, before utilizing it and/or using shortcuts key for several times to switch. The time and labor utilized in these transitions impacts the efficiency with which a user can complete a given activity.

The present disclosure provides, in part, methods, computer programs, and/or computer systems, for identifying a current task, obtaining an indicator of a commencement of a switching event from the current task to a next task, obtaining behavior analysis data, and determining, based on the behavior analysis data, at least one recommended next task.

Some embodiments of the present invention may provide advantages including, but not limited to, recommending or forecasting tasks to enable a user to navigate various programs and switch between tasks more efficiently. One advantage that may be provided by some embodiments of the present invention is that while increasing the efficiency of the user, utilization of aspects of these embodiments of the present invention do not impact the user's current usage habits while assisting the user to switch quickly from one task to another by anticipating the next task in a given activity in which the user is engaged.

Another advantage that may be provided by some embodiments of the present invention is a quantifiable daily increase in the efficiency of a given user. Aspects of the present invention increase the efficiency of a user by generating a pattern unique to that user based on his/her computing behaviors, for example, in a given window of time. Certain embodiments of the disclosed invention utilize these behaviors to improve the accuracy of the user automatically. For example, as the computing behavior of a given user is continuously gathered and analyzed, the accuracy with which the next task is recommended to a user, in response to obtaining an indicator of a switch from a current task, may improve, and therefore, the efficiency of the user may improve.

In addition to increasing the efficiency of an individual user, some embodiments of the present invention may also benefit the efficiency of a community of users. Some embodiments of the present invention may classify various monitored users into communities and user behavior data of related users to inform the forecasting for a given user.

Aspects of various embodiments of the present invention provide a unique solution for improving a user experience on a computing device. The approach is unique at least because when switching applications on present systems, programs managing task switching list display the active tasks in according to when each was accessed last accessed during the current computing session and do not account for any logic related to which task would be likely to be the next task, given attributes of the present task and/or user behavior. By assuming a user will necessary switch from a current task to the most recent task that is not the current task, present systems foreclose the user of any other predictors.

Some embodiments of the present invention may offer functionality described below to a user in a Software as a Service (SaaS) model, i.e., aspects of the method described are executed by one or more processors in a cloud infrastructure. Embodiments of the present invention that utilize the cloud infrastructure may be especially advantageous when aspects of the present invention are utilized to track the task switching behaviors of a community and predict the next task of a given user based on the task switching behaviors of individuals identified as belonging to a community with similar behaviors. By utilizing the cloud infrastructure, in certain embodiments of the present invention, the potential community that the software described below can reference is arguably unlimited.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
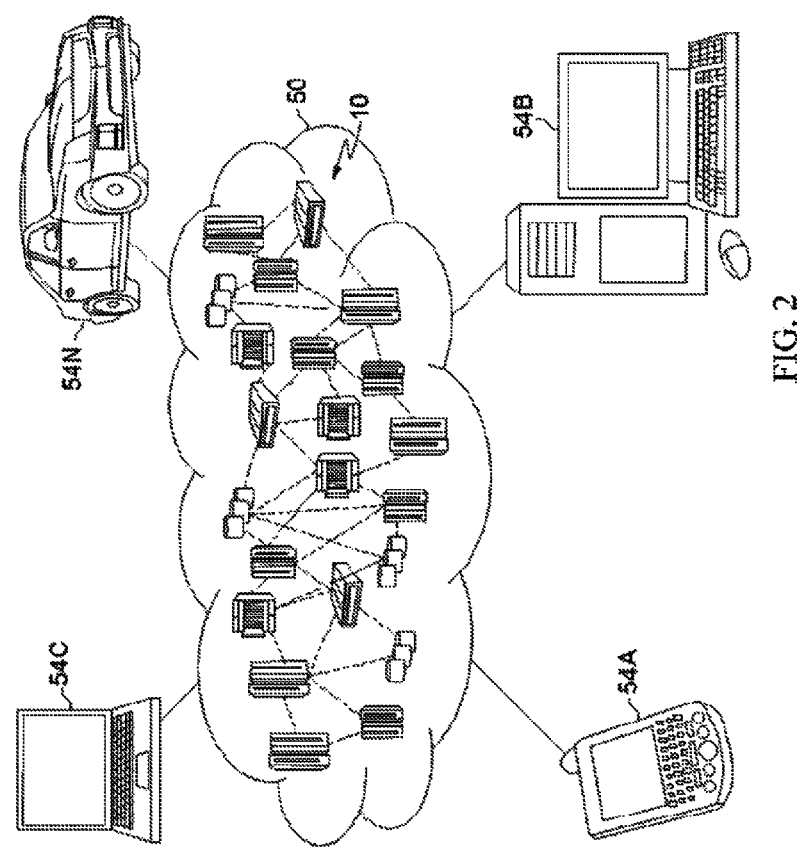
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
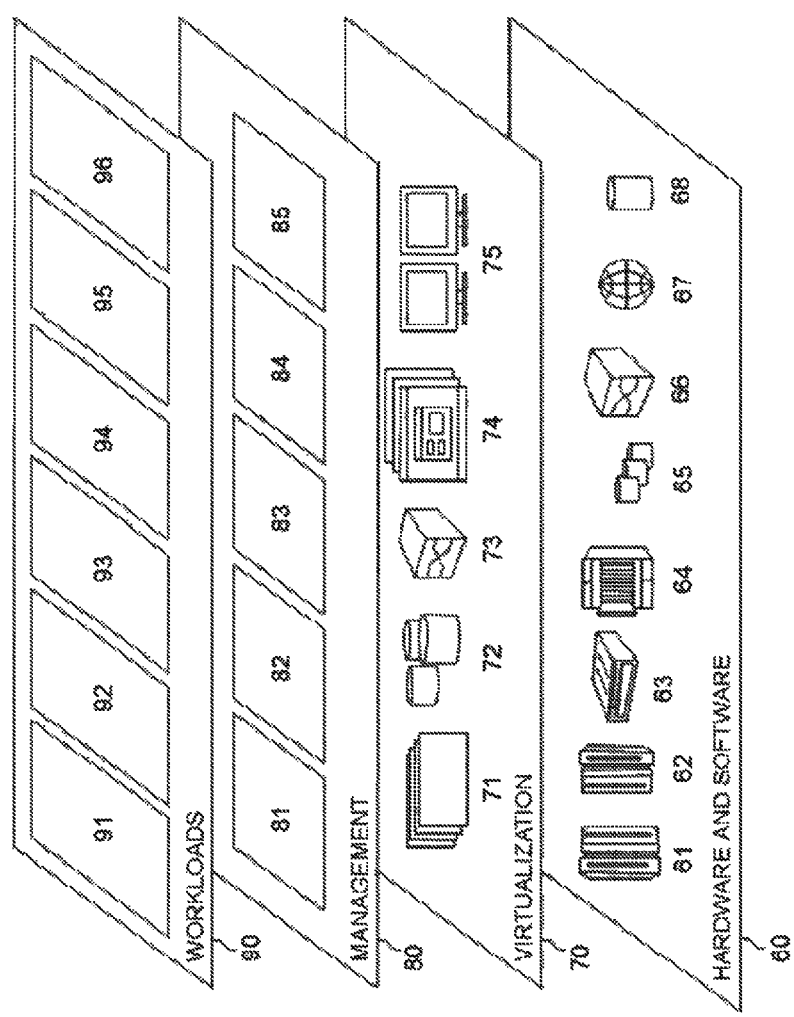
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining recommended tasks after the commencement of a switching event 96 as described herein.

Figure 4:
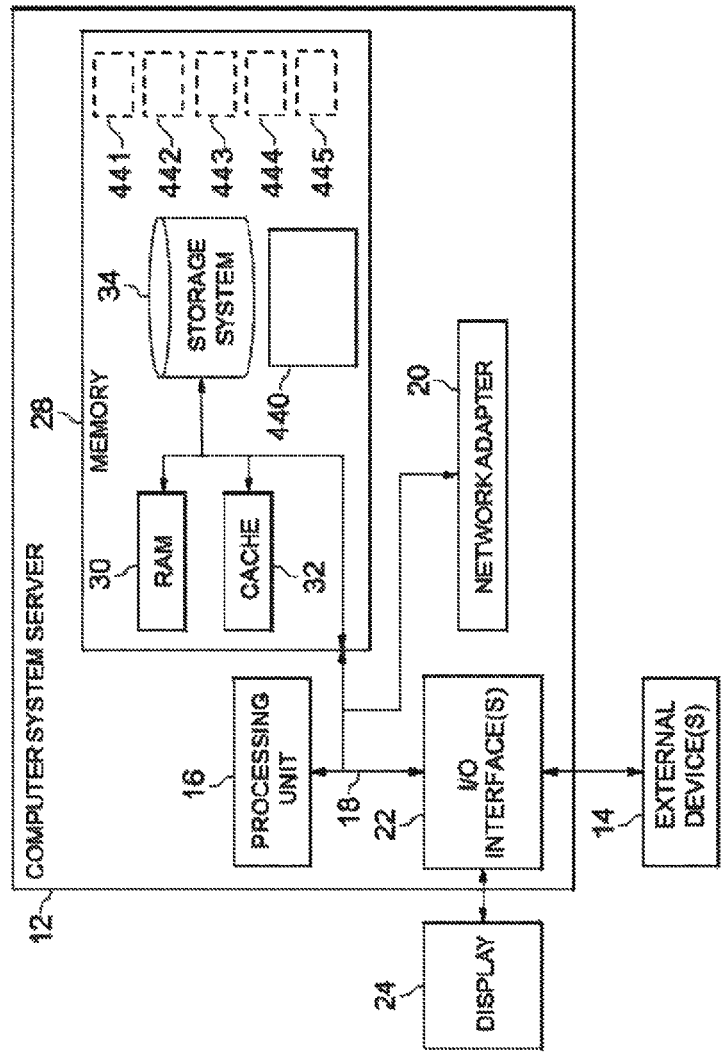
FIG. 4 depicts a hardware overview of a computing node, in accordance with one or more aspects set forth herein.

FIG. 4 depicts a hardware overview of a computing node 10, in accordance with one or more aspects set forth herein.

Program/utility 40 as set forth in FIG. 1 can include one or more program 440 as set forth in FIG. 4, and program/utility 40 can optionally include some or all of one or more program 441, 442, 443, 444, 445.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441, 442, 443, 444, 445) generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
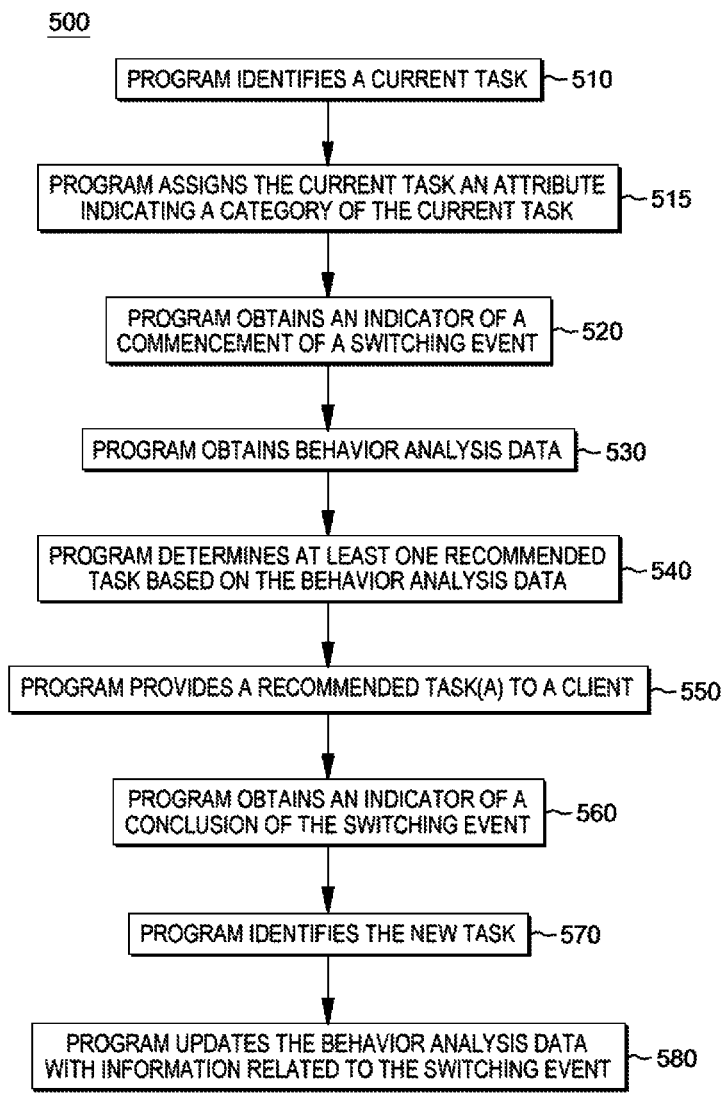
FIG. 5 depicts a workflow of an embodiment of the present invention.

FIG. 5 depicts a workflow 500 of an embodiment of the present invention. For ease of understanding, the workflow 500 will be described in the context of the system of FIG. 4. However, the system of FIG. 4 is offered merely as a non-limiting example as one of skill in the art will understand that the present invention can be implemented across a variety of computer systems, including mobile computer systems, and computer platforms.

Referring to FIG. 4, at least one processor in a processing unit 16 of a computer system server 12 executes computer code, such as one or more program 440, to implement a method. The one or more program 440 is accessible to the processing unit 16 and may reside of a memory resource in memory 28, and/or a resource external to the computer system server 12 and accessible to the processing unit 16.

Returning to FIG. 5, in an embodiment of the present invention, one or more program 440 executed by a processing unit 16 identifies a current task 510.

In an embodiment of the present invention, the one or more program 440 assigns the current task an attribute that indicates the category of the task. One or more program 440 classifies similar tasks to shared categories, for example, one or more program 440 may assign two or more similar tasks to a given category. In an embodiment of the present invention, a category of a given task is a description of the type of software application that renders the given task to the user. Examples of categories may include, but are not limited to, a browser (e.g., IE, FF, Chrome), an editor (e.g., Word, Excel), and/or a screenshot tool (e.g., X,Y). Tasks may include different instances of the same software application, where in each instance the user is working on a different file. The individual instances are referred to herein as sub-applications. Thus, if a user's current task is working in a file called C.doc, the category of this task may be, for example, "editor."

In an embodiment of the present invention, the one or more program 440 identifies the current task, and the one or more program 440 also identifies whether the current task is associated with an application and/or whether it is a file.

Figure 6:
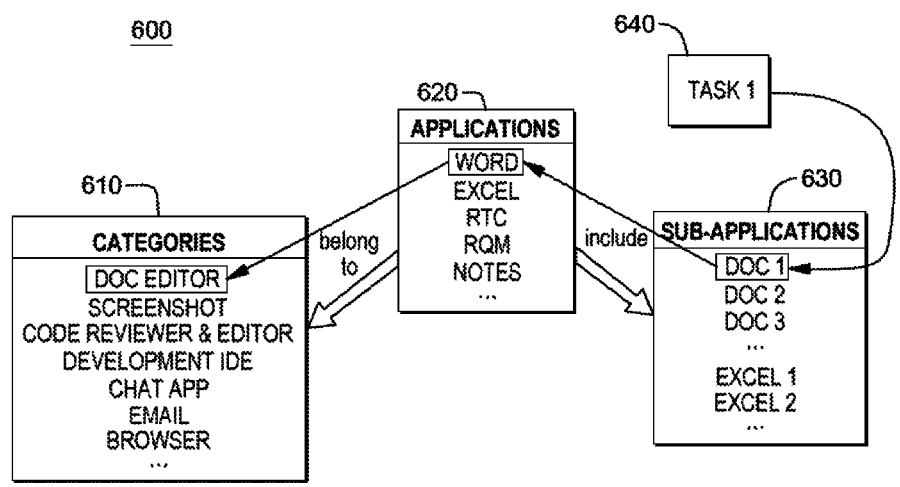
FIG. 6 depicts a classification of tasks into categories of tasks based on applications and sub-applications associated with each task, according to an embodiment of the present invention.

FIG. 6 depicts relationships 600 between categories 610, applications 620, and sub-applications 630. In an embodiment of the present invention, the one or more program 440 may associate each task with one or more of a category, application, and/or sub-application, in accordance with an embodiment of the present invention. As depicted in FIG. 6, in an embodiment of the present invention, one or more program 440 identifies Task 1 640 as being associated with DOC 1 sub-application, which is included in the WORD application, which belongs to the DOC EDITOR category. In an embodiment of the present invention, behavior analysis data may comprise the categories associated with tasks. The one or more program 440 may save the behavior analysis data on a memory resource, for example, in memory 28.

Table 1 is an example of how the one or more program 440 may save attributes related to a current task, such as the category, in the behavior analysis data. As seen below, the one or more program 440 identified a task, A.doc, as being a file utilized in Word, which it classified as an editor.

TABLE 1

| Task | File | Application | Function |
|------|------|-------------|----------|
| A.doc | Y | Word | Editor |
| B.doc | Y | Word | Editor |
| RTC | N | RTC | Defect Management Tool |
| Eclipse | N | Eclipse | IDE |
| Firefox | N | Firefox | Browser |
| D.xls | Y | Excel | Editor |
| B. xls | Y | Excel | Editor |
| PicPick | N | PicPick | Screenshot |

Returning to FIG. 5, the one or more program 440 obtains an indicator of a commencement of a switching event 520. A switching event occurs when a user transitions from one task to another. In this example, the switching event originates at the current task and will conclude at a new task.

As aforementioned, an advantage of embodiments of the present invention is that they do not impact the regular usage habits of the user. For example, the one or more program 440 may obtain the indicator in response to obtaining inputs from a user that indicate that the user is going to switch between tasks. These inputs include, but are not limited to, an Alt+Tab keystroke combination, and/or the user selecting a portion of a status bar. In another embodiment of the present invention, the one or more program 440 may obtain the indicator based on timing associated with the current task, rather than from a user input or action. For example, the one or more program 440 may obtain an indicator when a user has been engaged in the current task for a predefined period of time, and/or the user has taken no action, or no action related to, the current task in a pre-defined period of time.

The one or more program 440 obtains behavior analysis data 530. In an embodiment of the present invention, the one or more program 440 obtains the behavior analysis data from one or more memory resource, such as memory 28. The one or more program 440 obtains behavior analysis data related to past switching events that originated at the current task, but conclude at different tasks, which can be referred to as target tasks. In an embodiment of the present invention, the one or more memory resources may include additional behavior analysis data that are related to switching events that do not originate with the current task.

Upon detecting a switching event, in an embodiment of the present invention, the one or more program 440 timestamps a switching event. Thus, in an embodiment of the present invention, the one or more programs 440 has time-stamped past switching events. Utilizing the timestamp, in an embodiment of the present invention, the one or more program 440 may store data related to all switching events that occurred within a given window of time, on the one or more memory resource, and may purge, from the one or more resource, or otherwise disregard in a determination, data related to switching events that occurred outside of the given window.

Table 2 depicts an example of data relating to various switching events, which are included in the behavior analysis data. In the example below, the "Task" represents a current task at the commencement of a transition and the "SWITCH_TO" represents the target task at the conclusion of the switch. The "TIMESTAMP" represents the time of the switching event.

TABLE 2

| Task | SWITCH_TO | TIMESTAMP |
|------|-----------|-----------|
| Firefox | A.doc | Apr. 11, 2014 3:20 |
| A.doc | PicPick | Apr. 11, 2014 3:21 |
| PicPick | RTC | Apr. 11, 2014 3:22 |
| RTC | Firefox | Apr. 11, 2014 3:24 |
| Firefox | A.doc | Apr. 11, 2014 3:24 |
| A.doc | B.xls | Apr. 11, 2014 3:24 |
| B.xls | A.doc | Apr. 11, 2014 3:24 |
| A.doc | PicPick | Apr. 11, 2014 3:24 |
| PicPick | RTC | Apr. 11, 2014 3:24 |

As aforementioned, in an embodiment of the present invention, the behavior analysis data may include the category of each task, including the current task and the target tasks. The behavior analysis data may be user specific, related to a pre-defined user group, or may be relevant to a group of users that the one or more program 440 identifies as similar based on these users accomplishing similar activities by making similar transitions between tasks. In an embodiment of the present invention that utilizes the cloud infrastructure detailed in FIGS. 1-4, a group of users may include individuals with computing devices that access the same cloud computing infrastructure.

Returning to FIG. 5, the one or more program 440 determines at least one recommended task based on the behavior analysis data 540. As aforementioned, the behavior analysis data includes information about past switching events that originated with the current task and concluding with target tasks. The at least one recommended task may include at least one target task from the target tasks in these past twitching events. In an embodiment of the present invention, the one or more program 440 may determine a recommended task based on how many past switching events originated with the current task and concluded with the recommended task (i.e., one of the target tasks) and/or how recently one or more switching events originating at the current task concluded with the recommended task.

In an embodiment of the present invention, the one or more program 440 determining at least one recommended task includes the one or more program 440 assigning a weighted value to each past switching event that originated at the current task. The one or more program 440 may assign these values based on the timestamps in the records of the switching events in memory 28, such that the more recent events will be assigned larger values, i.e., the magnitude of the weighted value assigned to each past switching event will correspond to the proximity of the timestamp of that event to the current time.

Table 3 below is an example of switching events originating at the current task, A, and concluding at target tasks B and C. For each switching event, the one or more program 440 has assigned a date value, based on the timestamp. The date value for each switching event is shown in the Timestamp column in parenthesis (e.g., D1, D2, D3 . . . ).

TABLE 3

| Task | SWITCH_TO | TIMESTAMP |
|------|-----------|-----------|
| A | B | Today(D1) |
| A | B | Today - 1(D2) |
| A | B | Today - 2(D3) |

TABLE 3-continued

| Task | SWITCH_TO | TIMESTAMP |
|---|---|---|
| A | C | Today - 1(D2) |
| A | C | Today - N(D4) |
| A | C | Today - 2N(D5) |
| A | C | Today - 3N(D6) |
| ... | ... | ... |

Figure 7:
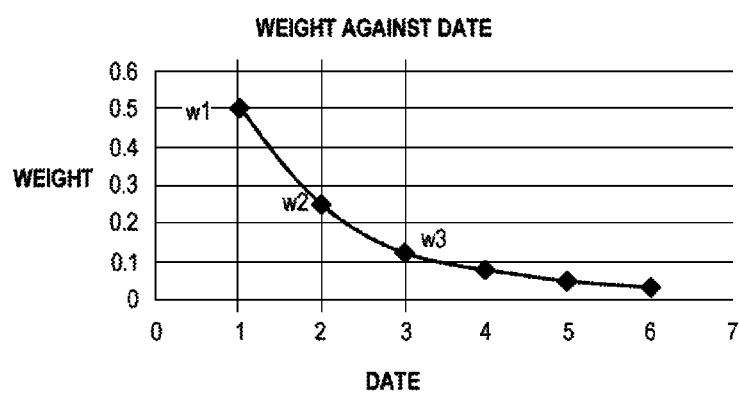
FIG. 7 depicts an example of a relationship between the timing of each switching event (Date) and the weighted value assigned (Weight) in accordance with an aspect of an embodiment of the present invention.

In an embodiment of the present invention, as part of determining at least one recommended task, the one or more program 440 assigns weighted values to past switching events. The weighted values enable the one or more program 440 to recommend at least one next task by evaluating both the timing of the past switching events as well as the frequency with which a user (or more than one user) has switched from the current event to various target events in the past. FIG. 7 illustrates an example of a relationship between the timing of each switching event (Date) and the weighted value assigned (Weight) as w1, w2, and w3.

Table 3, and the graph in FIG. 7, demonstrate how the one or more program 440 may assign weighted values to switching events, in an embodiment of the present invention. FIG. 7 is one example of the a relationship between Date and Weight that is utilized as a non-limiting example to provide better comprehension of aspects of the invention. As aforementioned, the "D" designations represent the dates upon which various switching events occurred. The first switching event in Table 3, a transition originating at A and concluding with B, occurred closest to the current time, e.g., "Today," and the one or more program 440 assigned the date value "D1." Referring to FIG. 7, the one or more program 440 assigns D1 a weighted value of W1 (e.g., 0.5). Using this same example, the one or more program 440 assigns D2 a weighted value of ~0.25 (W2), D3 a weighted value of ~0.12 (W3), etc. In this example, the one or more program 440 assigns weighted values in a greater magnitude to more recent switching events.

Equations 1-3 demonstrate one non-limiting example of how the one or more program 440 may determine a recommended next task from the behavior analysis data. These equations rely on the data in Table 3 and the weights assigned using FIG. 7.

In Equation 1, the one or more program 440 evaluates whether to recommend task "B" by looking at past switching events that transitioned from task "A," the current task in this example, to task "B." Note that there were three transitions and each is weighted based on how recently its corresponding transition occurred. In the Equations below, R1 represents a value representing switching events originating at current task A and concluding at target task B, and R2 represents switching events originating at current task A and concluding at target task C.

Referring to Equation 1, the one or more program 440 determines R1 based on the number of switching events with transitions from A to B, the dates (i.e., time) the events occurred, and the weighted values assigned to each date.

$$R1 = D1*W1 + D2*W2 + D3*W3 \quad \text{(Equation 1)}$$

Referring the Equation 2, the one or more program 440 determines R2 based on the number of switching events with transitions from A to C, the dates (i.e., time) the events occurred, and the weighted values assigned to each date.

$$R2 = D2*W2 + D4*W4 + D5*W5 + D6*W6 \quad \text{(Equation 2)}$$

Based on Equation 1 and Equation 2, Equation 3 demonstrates that R1 is greater than R2, even though R2 is comprised of more switching events than R1.

$$R1 > R2 \quad \text{(Equation 3)}$$

In an embodiment of the present invention, the one or more program 440 may recommend a task because R1 is more likely a transition than R2. However, in an embodiment of the present invention, the one or more program 440 may recommend more than one task. For example, the one or more program 440 may rank the tasks in order of a predicted likelihood that each is the next task based on the behavior analysis data (e.g., the R values of the transitions). Table 4 is an example of an instance in which the one or more program 440 recommends more than one task as the next task for current task, A. For example, Table 4 demonstrates that the one or more program 440 may recommend both R1 and R2. As determined in Equations 1-3, B is the most likely next task based on the behavior analysis data and thus, the one or more program 440 assigns B a 1st_FOLLOW_UP value below. Meanwhile, the one or more program 440 determined that C is the second most likely next task and thus, the one or more program 440 assigns C a 2nd_FOLLOW_UP value.

TABLE 4

| Task | 1st_FOLLOW_UP | 2nd_FOLLOW_UP |
|---|---|---|
| A | B | C |
| ... | ... | ... |

Figure 8:
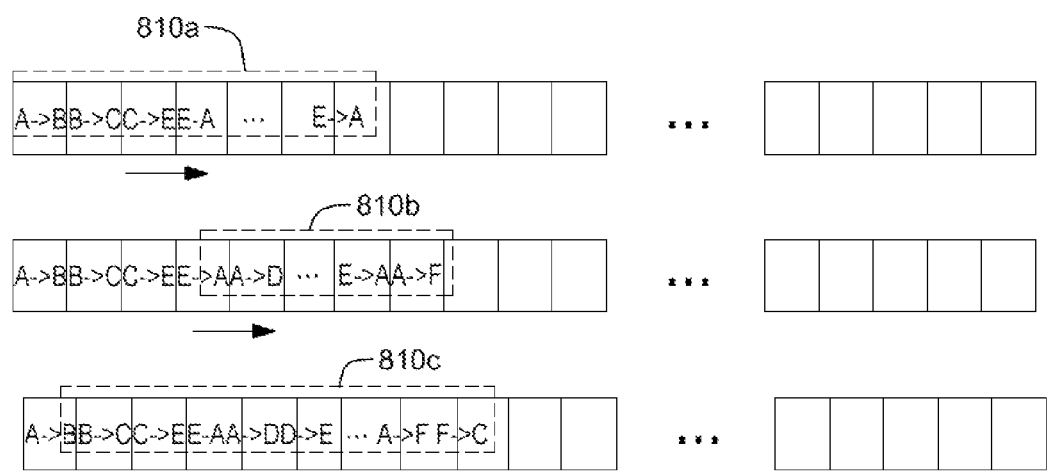
FIG. 8 depicts a dynamic window aspect of embodiment of the present invention.

In an embodiment of the present invention, the one or more program 440 may utilize a portion of the behavior analysis data in determining a recommended task(s). For example, a portion of the behavior analysis data may be selected based on the time that the switching events that the data represents occurred. In an embodiment of the present invention, the one or more program 440 utilizes certain switching events that occurred within a Weight-Based Dynamic Moving Window in determining a recommended task(s). FIG. 8 depicts some examples of behavior analysis data in the described Weight-Based Dynamic Moving Window 810a-810c.

Referring to FIG. 8, in an embodiment of the present invention, the one or more program 440 utilizes data related to past switching events that occurred within a fixed window of time (e.g., 30 days or 3 months). In an embodiment of the present invention, in order to determine a recommended task(s), the one or more program 440 relies upon behavior analysis data related to switching events in a fixed window, provided that the fixed window comprises at least a specified minimum amount of data and/or does not exceed a maximum amount. The maximum amount represents a maximum number of records in the window to enable the one or more program 440 to utilize timely data and filter out, for example, older and therefore less relevant records when determining a recommended task(s). The minimum amount represents a minimum number of records in the window, to enable the one or more program 440 to obtain enough data for determining a recommended task(s). For example, in an embodiment of the present invention, a minimum number of records may be as few as one (1) and a maximum number of records may be fifty (50). However, these numbers are offered as non-limiting examples as the window may be tailored in In an embodiment of the present invention, the one or more program 440 may dynamically adjust the Weight-Based Dynamic Moving Window which represents the behavior analysis data upon which the one or more program 440 will determine a recommended task(s). In an embodiment of the present invention, if the amount of data in the window exceed the maximum amount, the one or more program 440 will decrease the length of the window, and/or if the amount of data in the window is less than the minimum amount, the one or more program 440 will increase the length of the window. By dynamically adjusting the window, the portion of the behavior data the one or more program 440 obtains to determine a recommended task(s) can be consistent, in addition to being current.

Depending upon certain factors, including but not limited to, less than a minimum number of records of relevant behavior analysis data, the one or more program 440 may not be able to determine a recommended next task. For example, the one or more program 440 may identify a current task for which there are no past switching events in the behavior analysis data. In an embodiment of the present invention, the one or more program 440 may not recommend a next task after the commencement of a switching event.

In an embodiment of the present invention, the one or more program 440 assigns a weighted value to each record in the window. As discussed earlier in reference to FIG. 7, the one or more program 440 assigns a higher weight to a record (i.e., switching event) with a timestamp closer to a current time.

An advantage of the one or more program 440 utilizing behavior analysis data in a Weight-Based Dynamic Moving Window to determine a recommended task, is that the data in the Weight-Based Dynamic Moving Window may more accurately reflect the transition habits of the user and/or group associated with the switching events that comprise the data. Because the one or more program 440 can change the timeframe of the behavior analysis data in the window dynamically, the recommended task(s) are more likely to reflect the current habits of a user or a group as the determination is less likely to rely upon older and/or less relevant records or an amount of records that is too voluminous for an efficient analysis. Limiting the portion of behavior analysis data that the one or more program 440 utilizes to the data in the Weight-Based Dynamic Moving Window may also enable the computer system(s) 10 (FIG. 1) upon which the one or more program 440 is executed to maintain a consistent level of efficiency such that other processes executing on the computer system 10 (FIG. 1) are not affected by the execution of aspects of the one or more program 440 on a common computer system 10 (FIG. 1).

Figure 9A:
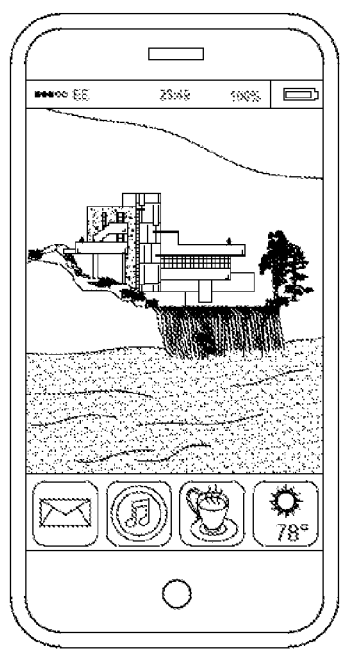
FIGS. 9A-9B depict examples of user interfaces that may be utilized in embodiments of the present invention.
Figure 9B:
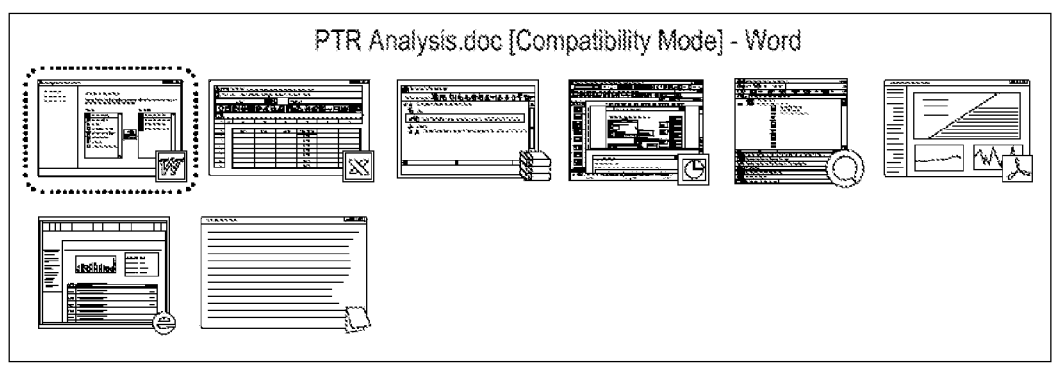

Returning to FIG. 5, in an embodiment of the present invention, the one or more program 440 provides a recommended task(s) to a client 550. The one or more program 440 may provide the recommended task(s) by identifying recommended task(s) as an option in a display 24 (FIG. 1). An advantage of the present invention is that it improves efficiency without altering the regular workflow of a user. Thus, the one or more program 440 may present or cause a presentation of the recommended task(s) to the user in an unobtrusive manner in the display 24 (FIG. 1). FIGS. 9A-9B depict examples of displays in which the one or more program 440 is providing a recommended task to a client.

FIG. 9A depicts the display of a mobile computing device. In this display 24 (FIG. 1), the one or more program 440 identifies the recommended task. In an embodiment of the present invention, the one or more program 440 may identify the recommended task by providing a visual indicator, such as a highlight.

FIG. 9B shows an implementation of an embodiment of the present invention in the task window in the display 24 (FIG. 1) of a personal computer after a user has indicated a switch by inputting Alt+Tab. As in FIG. 9A, the one or more program 440 highlights a recommended task.

In both FIGS. 9A and 9B, only one recommended task is identified on the client, however, these figures are meant to illustrate one possible implementation of aspects of an embodiment of the present invention. One of skill in the art will recognize that embodiments of the present invention may include a variety of different display options for providing one or more recommended task to a user.

Returning to FIG. 5, the one or more program 440 obtains an indicator of a conclusion of the switching event 560. As discussed earlier, a switching event concludes with a transition to a new task.

The one or more program 440 identifies the new task 570. The new task may or may not be a recommended task.

In response to completion of the switching event and the one or more program 440 identifying the new task, the one or more program 440 updates the behavior analysis data with information related to the now-completed switching event 580. So that this new behavior analysis data may be utilized by the one or more program 440 to recommend tasks during future switching events, the information saved may include, but is not limited to, a timestamp of a time of the transition originating from the current task and concluding at the new task, an identifier of the current task, and an identifier of the new task.

In another embodiment of the present invention, the one or more program 440 may determine a recommended next task based on the category of the current task. In this embodiment, the one or more program 440 determines a recommended task(s) based the categories associated with the current task, and the categories associated with the target tasks of past switching events originating at the current task and/or with a task with the same category as the current task.

Figure 10:
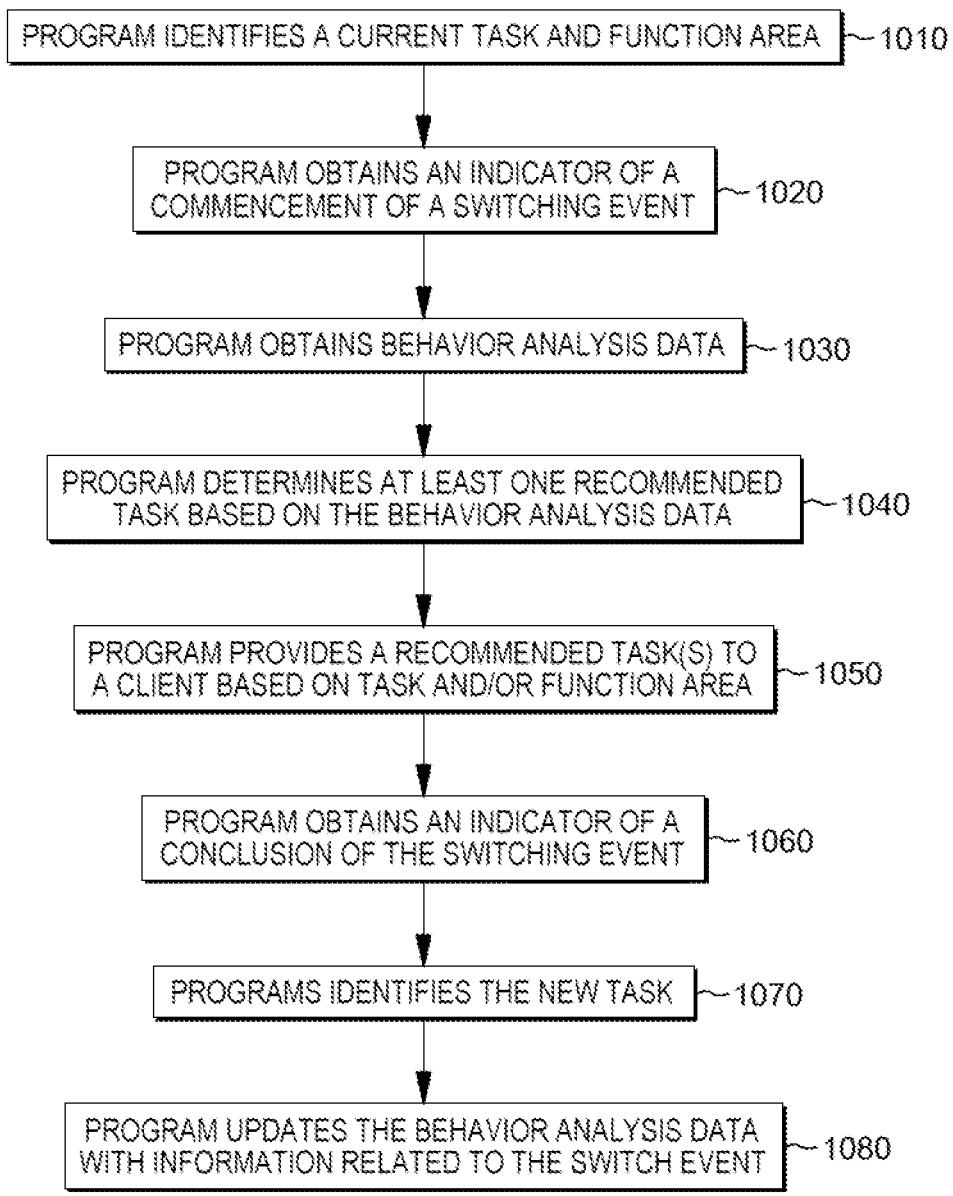
FIG. 10 depicts a workflow of an embodiment of the present invention.

FIG. 10 is a workflow 1000 of aspects of an embodiment of the present invention where the one or more program 440 incorporates behavior analysis data relation to the categories of various tasks represented by switching events into determining a recommended task(s).

In the embodiment of the present invention depicted as the workflow 1000 of FIG. 10, one or more program 440 executed by a processing unit 16 identifies a current task 1010 including identifying the category of the current task. The one or more program 440 obtains an indicator of a commencement of a switching event 1020. As explained in greater detail earlier in this paper, the one or more program 440 obtains behavior analysis data 1030. In this embodiment of the present invention, the behavior data includes the category of each of the target tasks.

In the embodiment of FIG. 10 in response to one or more program 440 determining at least one recommended task based on the behavior analysis data 1040, the one or more program 440 determines recommended task(s) on the task level as well as on the category level. Table 5 and Table 6 illustrate, respectively, task-level recommendations and category-level recommendations.

Referring first to Table 5, this table depicts a recommended task(s) for four different current tasks: Firefox, A.doc, PicPick, and RTC. As explained above, in an embodiment of the present invention, the 1ST_FOLLOW_UP is the most likely next task, based on the behavior analysis data, and the 2ND_FOLLOW_UP, is the next most likely next task, based on the behavior analysis data.

TABLE 5

| Task | 1ST_FOLLOW_UP | 2ND_FOLLOW_UP |
| --- | --- | --- |
| Firefox | A.doc | N/A |
| A.doc | PicPick | B.xls |
| PicPick | RTC | N/A |
| RTC | Firefox | N/A |
| ... | ... | ... |

Table 6 is an example of recommended task(s) for the current tasks, but these recommendations are based on the function-area of each task.

TABLE 6

| Category | 1ST_FOLLOW_UP | 2ND_FOLLOW_UP |
| --- | --- | --- |
| Editor | Screenshot | Editor |
| Browser | Editor | N/A |
| IDE | N/A | N/A |
| Defect Management Tool | Browser | N/A |
| ... | ... | ... |

In an embodiment of the present invention, by calculating each row in Table 2, the one or more program 440 generates a result table to record each application's follow-up as Table 5. By calculating each row in Table 5 in categories defined in Table 1, the one or more program 440 generates Table 6, which reflects the relationship of tasks in different functions. For example, utilizing the examples on Table 1 and FIG. 6, Firefox can be assigned to the category, browser, while A.doc can be assigned to the category, editor. Thus, while Table 5 reflects the current task Firefox, with a first recommended task of A.doc, Table 6 reflects the category of Browser, i.e., the category of Firefox, with a first recommended task of Editor, i.e., the category of A.doc.

Returning to FIG. 10, the one or more program 440 provides at least one recommended task to a client 1050. In an embodiment of the present invention, the one or more program 440 may determine the next task based on the task itself (e.g., the 1ST_FOLLOW_UP and/or 2ND_FOLLOW_UP for the current task from Table 5) and/or based on the category of the task (e.g., active tasks in the category of the 1ST_FOLLOW_UP and/or the 2ND_FOLLOW_UP, for the category of the current task from Table 5).

In an embodiment of the present invention, the one or more program 440 provides the 1ST_FOLLOW_UP task, and if the user does not select this task, the one or more program 440 provides the 2ND_FOLLOW_UP task, and if the user does not transition to this task, the one or more program 440 provides, as a recommended task(s), an active task(s) in the 1ST_FOLLOW_UP category, and if the user does not transition to this task, the active task(s) in the 2ND_FOLLOW_UP category. In a further embodiment of the present invention, if the one or more program 440 determines that the behavior analysis data for a given current task is less than the minimum amount, the one or more program 440 will provide recommended task(s) based on the category of the current task. In an embodiment of the present invention, if the one or more program 440 cannot provide recommended task(s) based on the functional area, if, for example, the data is not available, the one or more program 440 may not provide a recommendation.

Returning to FIG. 10, the one or more program 440 obtains an indicator of a conclusion of the switching event 1060 (e.g., the selection of a task). The one or more program 440 identifies the new task 1070, including the category of the new task. The new task may or may not be a recommended task(s). The one or more program 440 updates the behavior analysis data with information related to the now-completed switching event 1080.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:
1. A method comprising:
identifying, by one or more processor, a current task;

obtaining, by the one or more processor, an indicator of a commencement of a switching event, wherein the switching event comprises a transition originating from the current task and concluding at a new task;

obtaining, by the one or more processor, behavior analysis data relating to a plurality of past switching events, wherein each past switching event of the plurality of past switching events comprises a transition originating from the current task and concluding at one of a plurality of target tasks, the behavior analysis data comprising a timestamp for each past switching event;

determining, by the one or more processor, based on the behavior analysis data, at least one recommended task, wherein the at least one recommended task comprises at least one target task of the plurality of target tasks; and assigning, by the one or more processor, a weighted value to each past switching event based on the timestamps;

wherein magnitude of the weighted value assigned to each past switching event corresponds to proximity of the timestamp for each past switching event to a current time;

wherein the behavior analysis data further comprises the weighted value of each past switching event; and wherein the determining is performed so that a second of the plurality of past switching events occurring subsequent to a first of the plurality of past switching events is assigned a larger weight than the first of the plurality of past switching events based on second of the plurality of past switching events occurring closer in time to the current time than the first of the plurality of past switching events.

2. The method of claim 1, further comprising:

providing, by the one or more processor, the at least one recommended task to a client;

obtaining, by the one or more processor, an indicator of a conclusion of the switching event;

identifying, by the one or more processor, the new task; and updating, by the one or more processor, the behavior analysis data with information related to the switching event, wherein the information related to the switching event comprises a timestamp of a time of the transition originating from the current task and concluding at the new task.

3. The method of claim 1, wherein the at least one recommended task comprises the new task.

4. The method of claim 1, wherein the determining further comprises:

selecting, by the one or more processor, the at least one recommended task based on a count of each past switching event of the plurality of past switching events concluding at the at least one recommended task and the weighted value assigned to each past switching event of the plurality of past switching events concluding at the at least one recommended task.

5. The method of claim 1, wherein the timestamp for each past switching event of the plurality of past switching events is within a predefined window of time.

6. The method of claim 1, further comprising:

determining, by the one or more processor, a category for the current task and for each of the plurality of target tasks, wherein the behavior analysis data further comprises the category for the current task and for each of the plurality of target tasks in the behavior analysis data.

7. The method of claim 6, wherein a task of the at least one recommended task and the current task have a common category.

8. The method of claim 1, wherein the timestamp for each past switching event is within a given window of time, and wherein the obtaining behavior analysis data comprises obtaining a portion of data smaller than a predefined maximum amount of data and greater than a predefined minimum amount of data.

9. The method of claim 1, wherein the obtaining an indicator occurs prior to conclusion of the transition originating from the current task and concluding at a new task.

10. The method of claim 1, wherein the determining occurs prior to conclusion of the transition originating from the current task and concluding at a new task.

11. The method of claim 1, wherein the at least one recommended task is a task for initiation by a user to improve efficiency with which the user switches to the new task.

12. The method of claim 1, wherein the method includes presenting the one or more recommended task as a displayed option on a display for selection by a user, and wherein the method includes performing a recommended task of the one or more recommended task presented on the display responsively to action of the user.

13. The method of claim 1, wherein the determining includes predicting based on the behavior analysis data, for each target task of the plurality of target tasks, a likelihood of the target task being a next task transitioned to by a user, and specifying the one or more recommended task based on the predicting.

14. The method of claim 1, wherein the method includes specifying a target task of the plurality of target task as a recommend task of the at least one recommended task based on a predicting that the target task is a likely next task to be transitioned to by a user.

15. A computer program product comprising:

a computer readable storage medium readable by one or more processor and storing instructions for execution by the one or more processor for performing a method comprising:

identifying, by one or more processor, a current task;

obtaining, by the one or more processor, an indicator of a commencement of a switching event, wherein the switching event comprises a transition originating from the current task and concluding at a new task;

obtaining, by the one or more processor, behavior analysis data relating to a plurality of past switching events, wherein each past switching event of the plurality of past switching events comprises a transition originating from the current task and concluding at one of a plurality of target tasks, the behavior analysis data comprising a timestamp for each past switching event;

determining, by the one or more processor, based on the behavior analysis data, at least one recommended task, wherein the at least one recommended task comprises at least one target task of the plurality of target tasks; and assigning, by the one or more processor, a weighted value to each past switching event based on the timestamps;

wherein magnitude of the weighted value assigned to each past switching event corresponds to proximity of the timestamp for each past switching event to a current time;

wherein the behavior analysis data further comprises the weighted value of each past switching event; and wherein the determining is performed so that a second of the plurality of past switching events occurring subsequent to a first of the plurality of past switching events is assigned a larger weight than the first of the plurality of past switching events based on second of the plurality of past switching events occurring closer in time to the current time than the first of the plurality of past switching events.

16. The computer program product of claim 15, further comprising:

providing, by the one or more processor, the at least one recommended task to a client;

obtaining, by the one or more processor, an indicator of a conclusion of the switching event;

identifying, by the one or more processor, the new task; and updating, by the one or more processor, the behavior analysis data with information related to the switching event, wherein the information related to the switching event comprises a timestamp of a time of the transition originating from the current task and concluding at the new task.

17. The computer program product of claim 15, wherein the determining further comprises:

assigning, by the one or more processor, a weighted value to each past switching event based on the timestamps, wherein magnitude of the weighted value assigned to each past switching event corresponds to proximity of the timestamp for each past switching event to a current time, and wherein the behavior analysis data further comprises the weighted value of each past switching event.

18. A system comprising:

a memory;

one or more processor in communication with the memory; and program instructions executable by the one or more processor via the memory to perform a method, the method comprising:

identifying, by the one or more processor, a current task;

obtaining, by the one or more processor, an indicator of a commencement of a switching event, wherein the switching event comprises a transition originating from the current task and concluding at a new task;

obtaining, by the one or more processor, behavior analysis data relating to a plurality of past switching events, wherein each past switching event of the plurality of past switching events comprises a transition originating from the current task and concluding at one of a plurality of target tasks, the behavior analysis data comprising a timestamp for each past switching event;

determining, by the one or more processor, based on the behavior analysis data, a recommended task, wherein the recommended task comprises a target task of the plurality of target tasks, and wherein the determining includes predicting, for each target task of the plurality of target tasks a likelihood of the target task being a next task transitioned to, and specifying as the recommended task a target task of the plurality of target tasks predicted most likely to be the next task; and assigning, by the one or more processor, a weighted value to each past switching event based on the timestamps;

wherein magnitude of the weighted value assigned to each past switching event corresponds to proximity of the timestamp for each past switching event to a current time;

wherein the behavior analysis data further comprises the weighted value of each past switching event; and wherein the determining is performed so that a second of the plurality of past switching events occurring subsequent to a first of the plurality of past switching events is assigned a larger weight than the first of the plurality of past switching events based on second of the plurality of past switching events occurring closer in time to the current time than the first of the plurality of past switching events.

\* \* \* \* \*